United States Patent
Flory et al.

(10) Patent No.: US 9,315,077 B2
(45) Date of Patent: Apr. 19, 2016

(54) TIRE INFLATION SYSTEM HAVING A PASSAGE FOR ROUTING PRESSURIZED GAS THROUGH A HUB

(71) Applicant: ArvinMeritor Technology, LLC, Troy, MI (US)

(72) Inventors: Ken Flory, Commerce Township, MI (US); Michael Andrew Power, Troy, MI (US); James Keane, West Bloomfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 260 days.

(21) Appl. No.: 14/017,375

(22) Filed: Sep. 4, 2013

(65) Prior Publication Data
US 2015/0059945 A1   Mar. 5, 2015

(51) Int. Cl.
*B62B 1/00* (2006.01)
*B60C 23/00* (2006.01)

(52) U.S. Cl.
CPC ................... *B60C 23/003* (2013.01)

(58) Field of Classification Search
CPC .... B60C 23/00; B60C 23/001; B60C 23/003; B60C 23/004; B60C 23/10; B60C 23/16; B60C 29/00

USPC .......................................... 152/415, 416, 417
See application file for complete search history.

(56) References Cited

U.S. PATENT DOCUMENTS

| | | | |
|---|---|---|---|
| 4,733,707 A * | 3/1988 | Goodell et al. ............... | 152/417 |
| 6,994,136 B2 | 2/2006 | Stanczak | |
| 7,205,760 B2 * | 4/2007 | Swanson ...................... | 324/174 |
| 7,690,412 B1 | 4/2010 | Jenkinson et al. | |
| 7,931,061 B2 | 4/2011 | Gonska et al. | |
| 8,042,585 B2 * | 10/2011 | Isono ............................ | 152/416 |
| 8,616,254 B2 | 12/2013 | Kelley et al. | |
| 2012/0186714 A1 | 7/2012 | Richardson | |
| 2012/0234447 A1 | 9/2012 | Narloch et al. | |

OTHER PUBLICATIONS

Meritor an ArvinMeritor brand, Meritor Tire Inflation System (MTIS) by PSI(TM), including Mentor ThermALERT (TM), PB-9999, Revised May 2007.

* cited by examiner

*Primary Examiner* — John Walters
*Assistant Examiner* — James Triggs
(74) *Attorney, Agent, or Firm* — Brooks Kushman P.C.

(57) ABSTRACT

A tire inflation system having a conduit, a hub, and a seal assembly. The hub may be rotatably mounted on a spindle and may have a passage. The seal assembly may have a seal passage that fluidly connects the conduit to the passage.

20 Claims, 2 Drawing Sheets

TIRE INFLATION SYSTEM HAVING A PASSAGE FOR ROUTING PRESSURIZED GAS THROUGH A HUB

TECHNICAL FIELD

This patent application relates to a tire inflation system that has a passage for routing pressurized gas through a hub.

BACKGROUND

A tire inflation system with an integral wheel seal is disclosed in U.S. Pat. No. 7,931,061.

SUMMARY

In at least one embodiment, a tire inflation system is provided. The tire inflation system may include a conduit, a hub, and a seal assembly. The conduit may supply a pressurized gas for inflating a tire. The hub may be rotatably mounted on a spindle and may have a passage that routes the pressurized gas through the hub. The seal assembly may be disposed between the conduit and the hub. The seal assembly may have a seal passage that may fluidly connect the conduit to the passage.

In at least one embodiment, a tire inflation system is provided. The tire inflation system may include a conduit, a hub, and a seal assembly. The conduit may supply a pressurized gas for inflating a tire. The hub may be rotatably disposed on a spindle and may have a passage that may extend from a first hub surface to a second hub surface. The seal assembly may be disposed proximate the first hub surface. The seal assembly may have a seal passage that may fluidly connect the conduit to the passage.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
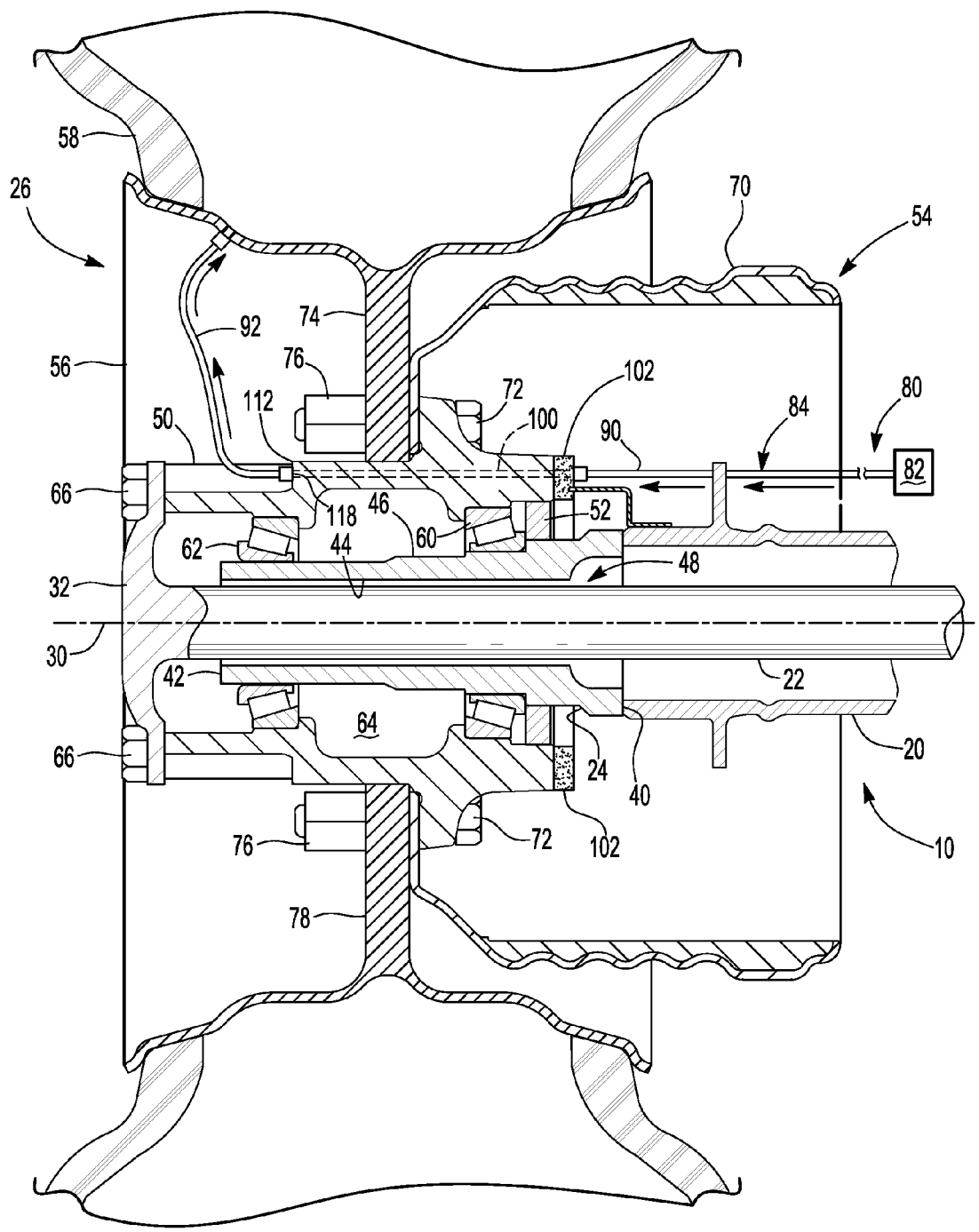
FIG. 1 is a section view of an exemplary wheel end assembly having a tire inflation system.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may or may not be steerable. In a drive axle configuration, the axle assembly 10 may include an axle housing 20, an axle shaft 22, a spindle 24, and a wheel end assembly 26.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel end seal assembly 52, a brake subsystem 54, a wheel 56, and a tire 58.

The hub 50 may be rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24.

The brake subsystem 54 may be adapted to slow or inhibit rotation of at least one associated wheel 56. For example, the brake subsystem 54 may be configured as a friction brake, such as a drum brake or a disc brake. In FIG. 1, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

A tire inflation system 80 may be associated with the wheel end assembly 26. The tire inflation system 80 may be disposed on the vehicle and may be configured to provide a pressurized gas or pressurized gas mixture to one or more tires 58. For clarity, the term "pressurized gas" may refer to either a pressurized gas or a pressurized gas mixture. The tire inflation system 80 may include a control system that may monitor and control the inflation of one or more tires 58, a pressurized gas source 82, and a gas supply subsystem 84.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle and may provide a pressurized gas or pressurized gas mixture at a pressure that is greater than or equal to a desired inflation pressure of a tire 58. As such, the pressurized gas source 82 may inflate a tire or maintain a desired tire pressure.

The gas supply subsystem 84 may fluidly connect the pressurized gas source 82 to the tire 58. The gas supply subsystem 84 may include one or more conduits, such as a hose, tubing, pipe, or combinations thereof. In FIG. 1, a first conduit 90 and a second conduit 92 are shown. The first conduit 90 may be fluidly connected to and may receive pressurized gas from the pressurized gas source 82. The second conduit 92 may supply pressurized gas to the tire 58. In addition, one or more valves may be associated with or provided with a conduit to enable or disable the flow of the pressurized gas from the pressurized gas source 82 to one or more tires 58. The routing of the conduits between the pressurized gas source 82 and a tire 58 is exemplary and is not meant to be limiting as other conduit routing paths may be provided. The flow of pressurized gas is represented by the arrows in the conduits in FIG. 1.

Figure 2:
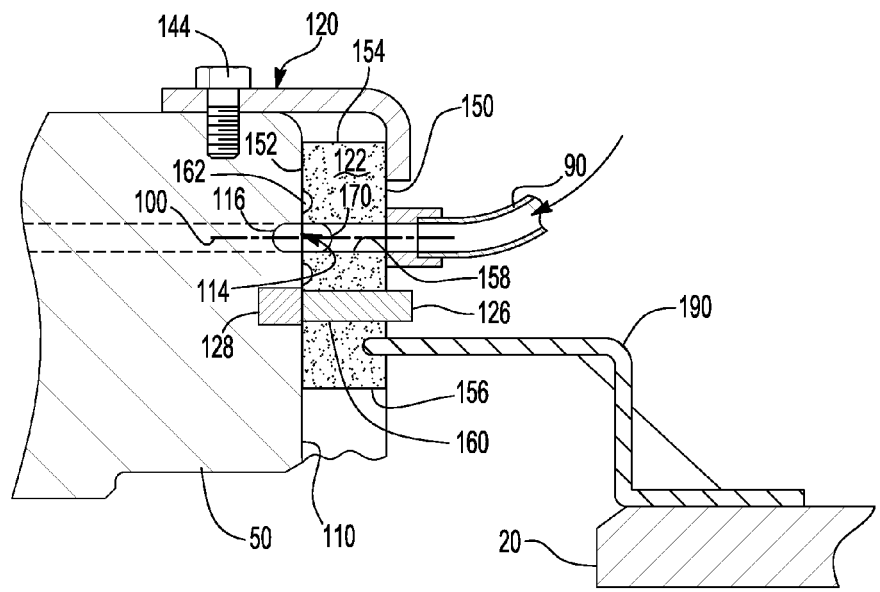
FIGS. 2 and 3 are section views of exemplary hub seal assemblies that may be provided with the wheel end assembly.
Figure 3:
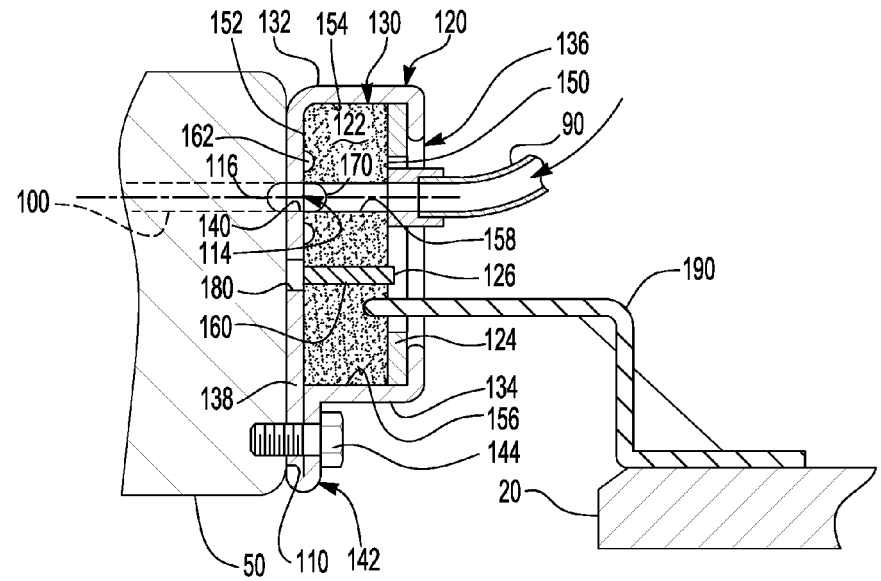

Referring to FIGS. 2 and 3, exemplary interfaces between the wheel end assembly 26 and the gas supply subsystem 84 are shown. In FIGS. 2 and 3, the hub 50 may include a passage 100 for routing pressurized gas through the hub 50. In addition, a seal assembly 102 is provided for fluidly connecting the pressurized gas source 82 to the passage 100.

The passage 100 may extend through the hub 50. In addition, the passage 100 or a portion thereof may extend substantially parallel to the axis 30. In one or more embodiments, the passage 100 may extend from a first hub surface 110 to a second hub surface 112.

The first hub surface 110 may be an exterior surface of the hub 50 that may face inboard or away from the axle flange 32. In addition, the first hub surface 110 may be disposed proximate and may engage the seal assembly 102. The first hub surface 110 may have a passage inlet 114 that receives pressurized gas from the pressurized gas source 82. The passage inlet 114 may be part of the passage 100 and may include a passage inlet groove 116. The passage inlet groove 116 may face toward the seal assembly 102 and may extend continuously around the axis 30 in a ring-like manner. As such, the passage inlet groove 116 may receive pressurized gas from the seal assembly 102 as the hub 50 rotates about the axis 30 and with respect to at least a portion of the seal assembly 102.

The second hub surface 112 may be an exterior surface of the hub 50 and may be spaced apart from the first hub surface 110. For example, the second hub surface 112 may be disposed on an opposite side of the wheel mounting flange 74 from the first hub surface 110 as is best shown in FIG. 1. In addition, the second hub surface 112 may be disposed directly opposite the first hub surface 110 in one or more embodiments. The second hub surface 112 may have a passage outlet 118 that may be configured to provide pressurized gas to the tire 58. The passage outlet 118 may be part of the passage 100 and may be fluidly connected to the tire 58 by the second conduit 92. The passage outlet 118 may be disposed between the outboard side 78 of the wheel mounting flange 74 and the axle flange 32. As such, the passage 100 may extend through the hub 50 to facilitate the routing of pressurized gas from one side of the wheel 56 to another, which may facilitate the supply of pressurized gas to a tire inflation valve that may be provided on an outboard side of the wheel end assembly 26.

The seal assembly 102 may be disposed between the pressurized gas source 82 and the hub 50. More specifically, the seal assembly 102 may receive pressurized gas from the pressurized gas source 82 via a first conduit 90 and may fluidly connect the first conduit 90 to the passage 100. The seal assembly 102 may be disposed proximate the first hub surface 110 and may be spaced apart from the wheel end seal assembly 52. In at least one embodiment, the seal assembly 102 may include a mounting bracket 120 and a seal 122. In addition, the seal assembly 102 may optionally include a spacer 124, a tone ring sensor 126, and a tone ring 128.

The mounting bracket 120 may position and hold the seal 122. The mounting bracket 120 may be fixedly disposed on the hub 50. As such, the mounting bracket 120 may rotate with the hub 50 and with respect to the seal 122.

The mounting bracket 120 may be provided in various configurations. In FIG. 2, a mounting bracket 120 is shown that holds the seal 122 against the first hub surface 110. As such, the mounting bracket 120 may hold the seal 122 against the hub 50 such that leakage of pressurized gas between the seal 122 and the hub 50 is inhibited. A single mounting bracket 120 may extend continuously around the axis 30 in a ring-like manner or a plurality of mounting brackets 120 may be provided that may be spaced apart from each other and arranged around the axis 30 to hold the seal against the hub 50. The mounting bracket 120 may be secured to the hub 50 in any suitable manner, such as with the fastener 72 or with a different fastener as shown in FIG. 2.

In FIG. 3, the mounting bracket 120 may extend continuously around the axis 30 in a ring-like manner and may define a cavity 130 that may receive the seal 122. More specifically, the mounting bracket 120 may include a first wall 132 and a second wall 134 that may cooperate to define an opening 136. The first wall 132 may be spaced apart from the second wall 134 and may at least partially define an outside circumference of the mounting bracket 120. The second wall 134 may at least partially define an inside circumference of the mounting bracket 120. The seal 122 may be disposed between and may engage the first wall 132 and the second wall 134 to help position the seal 122.

A third wall 138 may be disposed between the seal 122 and the hub 50. The third wall 138 may include one or more gas passage openings 140. For example, a single gas passage opening 140 may extend through the third wall 138, or a plurality of gas passage openings 140 may be provided that may be spaced apart from each other and radially disposed around the axis 30. As such, multiple gas passage openings may be provided to permit pressurized gas to pass through the mounting bracket 120 when the seal 122 rotates with respect to the hub 50 and mounting bracket 120. The third wall 138 may also include a flange portion 142 that may facilitate mounting of the mounting bracket 120 to the hub 50. The flange portion 142 may be disposed outside of the cavity 130 and may include a hole that may receive a fastener 144 that may facilitate mounting of the mounting bracket 120 to the hub 50.

The seal 122 may fluidly connect the first conduit 90 to the passage 100. The seal 122 may be configured as a ring that may extend continuously around the spindle 24 and the axis 30. In at least one embodiment, the seal 122 may have a first seal surface 150, a second seal surface 152, an outer seal surface 154, an inner seal surface 156, a seal passage 158, and a tone ring sensor hole 160.

The first seal surface 150 may face away from the hub 50. The first seal surface 150 may be disposed proximate the first conduit 90 that provides a pressurized gas from the pressurized gas source 82.

The second seal surface 152 may face toward the hub 50. The second seal surface 152 may include one or more lip seals 162. A lip seal 162 may be provided around the seal passage 158 and/or the tone ring sensor hole 160. A lip seal 162 may be configured as a groove or indentation in the second seal surface 152 that may extend around and may be spaced apart from a hole or passage in the seal 122 to facilitate compression of the seal 122 and improve sealing between the seal 122 and the hub 50 or mounting bracket 120.

The outer seal surface 154 may extend from the first seal surface 150 to the second seal surface 152. The outer seal surface 154 may be spaced apart from the inner seal surface 156 and may at least partially define an outside circumference of the seal 122.

The inner seal surface 156 may face toward the axis 30 and may at least partially define an inside circumference of the seal 122. In the embodiment shown in FIG. 3, the outer seal surface 154 may engage the first wall 132 of the mounting bracket 120 and the inner seal surface 156 may engage the second wall 134 of the mounting bracket 120 to help position the seal 122 and inhibit movement of the seal 122 toward or away from the axis 30.

The seal passage 158 may be configured as a through hole that may extend from the first seal surface 150 to the second seal surface 152. The seal passage 158 may fluidly connect the first conduit 90 to the passage 100 in the hub 50. The seal passage 158 may include a seal groove 170. The seal groove 170 may face toward the hub 50 and may extend continuously around the axis 30 in a ring-like manner. As such, the seal groove 170 may distribute pressurized gas around the axis 30 and permit pressurized gas to flow into the passage 100 in the hub 50 and/or through one or more openings in the mounting bracket 120 as the hub 50 rotates with respect to the seal 122. The seal groove 170 may be provided whether or not the hub 50 includes a passage inlet groove 116 or may be omitted when a passage inlet groove 116 is provided.

The tone ring sensor hole 160 may be configured as a through hole that may extend from the first seal surface 150 to the second seal surface 152. The tone ring sensor hole 160 may be spaced apart from the seal passage 158 and may receive the tone ring sensor 126.

The tone ring sensor 126 may be provided with an antilock brake system and may be configured to detect rotation of the hub 50 about the axis 30. For example, the tone ring sensor 126 may detect features that may be provided with the hub 50 or mounting bracket 120. In FIG. 2, a tone ring 180 is provided in a recess in the hub 50. The tone ring 180 may have a plurality of openings that may be spaced apart from each other. The tone ring sensor 126 may detect the presence or absence of an opening in the tone ring 128 and may provide a corresponding signal that may be indicative of rotation of the hub 50 and wheel 56. In FIG. 3, a plurality of tone ring openings 180 are provided in the mounting bracket 120 rather than with a separate tone ring. As such, the tone ring openings 18 in the mounting bracket 120 may move past the tone ring sensor 126 when the hub 50 rotates about the axis 30.

Referring to FIG. 3, the spacer 124 may be disposed between the mounting bracket 120 and the seal 122. In at least one embodiment, the spacer 124 may be configured to exert a biasing force on the seal 122 that may bias the seal 122 toward the hub 50. For example, the spacer 124 may be configured as a washer, wave washer, conical washer, or spring in one or more embodiments. In FIG. 3, the spacer 124 is disposed proximate the second seal surface 152 and may generally extend around the opening 136 in the mounting bracket 120 and/or the axis 30.

An anti-rotation bracket 190 may be provided to inhibit rotation of at least a portion of the seal assembly 102 with respect to the hub 50 and mounting bracket 120. More specifically, the anti-rotation bracket 190 may be fixedly disposed on a component that does not rotate about the axis 30, such as the axle housing 20 or spindle 24. The anti-rotation bracket 190 may engage the seal 122 and hold the seal 122 in a stationary position relative to the hub 50. Moreover, the anti-rotation bracket 190 may have a distal end that may be disposed in a recess or indentation in the seal 122 in one or more embodiments. In addition, the anti-rotation bracket 190 may be spaced apart from the mounting bracket 120.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A tire inflation system comprising:
   a conduit for supplying a pressurized gas for inflating a tire;
   a hub that is rotatably mounted on a spindle and that has a passage that routes the pressurized gas through the hub; and
   a seal assembly that is disposed between the conduit and the hub, wherein the seal assembly has a seal passage that fluidly connects the conduit to the passage, the seal assembly does not engage the spindle, and the hub rotates with respect to a seal of the seal assembly.

2. The tire inflation system of claim 1 further comprising a wheel end seal assembly that extends between the hub and the spindle, wherein the seal assembly is spaced apart from the wheel end seal assembly.

3. The tire inflation system of claim 1 wherein the passage has a passage outlet that is fluidly connected to the tire that is disposed on a wheel that is mounted to the hub.

4. The tire inflation system of claim 3 wherein the wheel has a wheel mounting flange that is disposed proximate the hub, wherein the passage outlet is disposed between an outboard side of the wheel mounting flange and an axle flange that is disposed at a distal end of an axle shaft that extends through the spindle.

5. The tire inflation system of claim 4 wherein the axle shaft rotates about an axis and wherein the passage extends substantially parallel to the axis.

6. The tire inflation system of claim 1 further comprising an anti-rotation bracket that inhibits rotation of the seal assembly with respect to the hub.

7. The tire inflation system of claim 6 wherein the spindle and the anti-rotation bracket are fixedly disposed on an axle housing.

8. A tire inflation system comprising:
a conduit for supplying a pressurized gas for inflating a tire;
a hub that is rotatably disposed on a spindle, wherein the hub has a passage that extends from a first hub surface to a second hub surface;
a seal assembly that is disposed proximate the first hub surface, wherein the seal assembly has a seal that has a seal passage that fluidly connects the conduit to the passage; and
an anti-rotation bracket that inhibits rotation of the seal with respect to the hub.

9. The tire inflation system of claim 8 wherein the seal assembly includes a mounting bracket, wherein the mounting bracket holds the seal against the hub such that leakage of pressurized gas between the seal and the hub is inhibited.

10. The tire inflation system of claim 9 wherein the hub and mounting bracket rotate with respect to the seal.

11. The tire inflation system of claim 9 wherein the mounting bracket is fixedly disposed on the hub.

12. The tire inflation system of claim 11 wherein the seal is configured as a ring that extends continuously around the spindle.

13. The tire inflation system of claim 12 wherein the mounting bracket defines a cavity that extends continuously around the spindle, wherein the seal is disposed in the cavity.

14. The tire inflation system of claim 13 wherein the seal has an outer seal surface and an inner seal surface disposed opposite the outer seal surface, wherein the mounting bracket engages the inner seal surface and the outer seal surface.

15. The tire inflation system of claim 14 further comprising a spacer that is disposed between the seal and the mounting bracket, wherein the spacer biases the seal toward the hub.

16. The tire inflation system of claim 9 wherein the seal includes a seal groove that extends continuously around an axis and that fluidly connects the seal passage to the passage in the hub.

17. The tire inflation system of claim 9 wherein the hub includes a passage inlet groove that extends continuously around an axis and that fluidly connects the seal passage to the passage in the hub.

18. The tire inflation system of claim 9 further comprising a tone ring sensor that extends through the seal assembly, wherein the tone ring sensor is spaced apart from the seal passage.

19. The tire inflation system of claim 18 further comprising a set of tone ring openings that are provided in the mounting bracket and disposed around an axis, wherein the tone ring sensor is configured to detect the tone ring openings when the hub rotates about the axis.

20. The tire inflation system of claim 6 wherein the passage in the hub extends from a first hub surface to a second hub surface that is disposed opposite the first hub surface, wherein the conduit is mounted to the seal assembly opposite the first hub surface.

* * * * *